(No Model.) 2 Sheets—Sheet 2.
J. McTURNER, W. J. BOREN & S. H. TURNER.
APPARATUS FOR LOADING WAGONS WITH GRAVEL, SAND, &c.
No. 512,988. Patented Jan. 16, 1894.
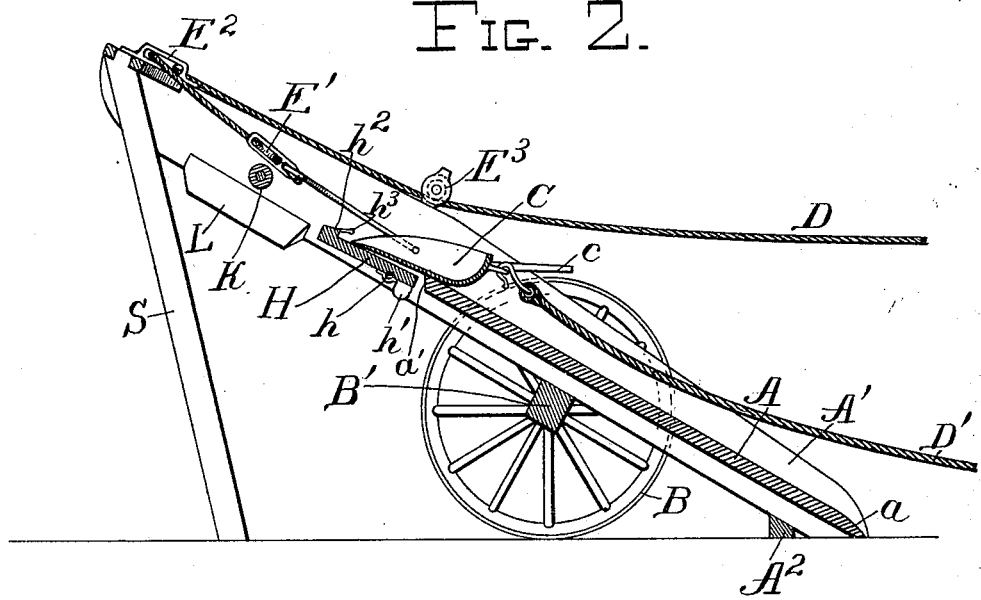
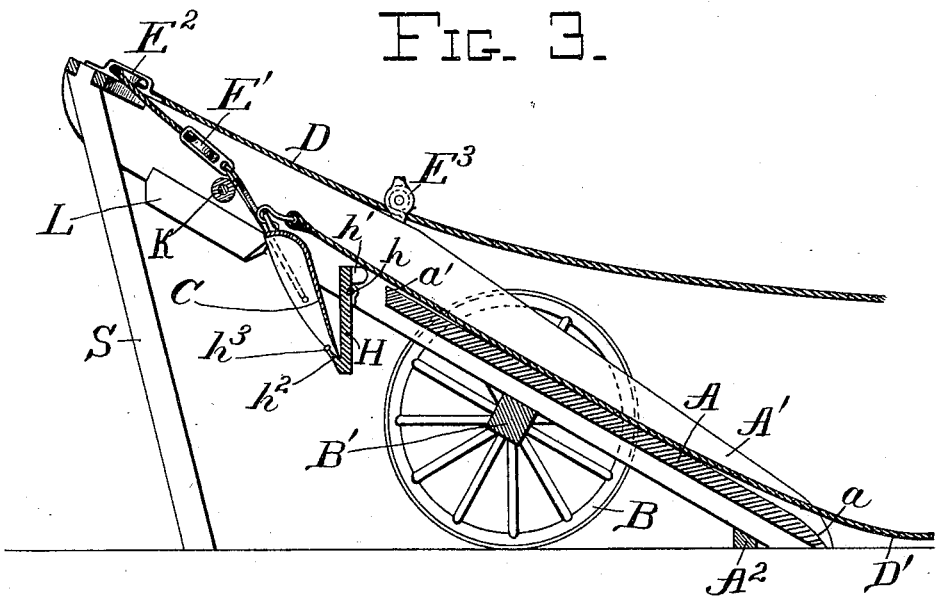

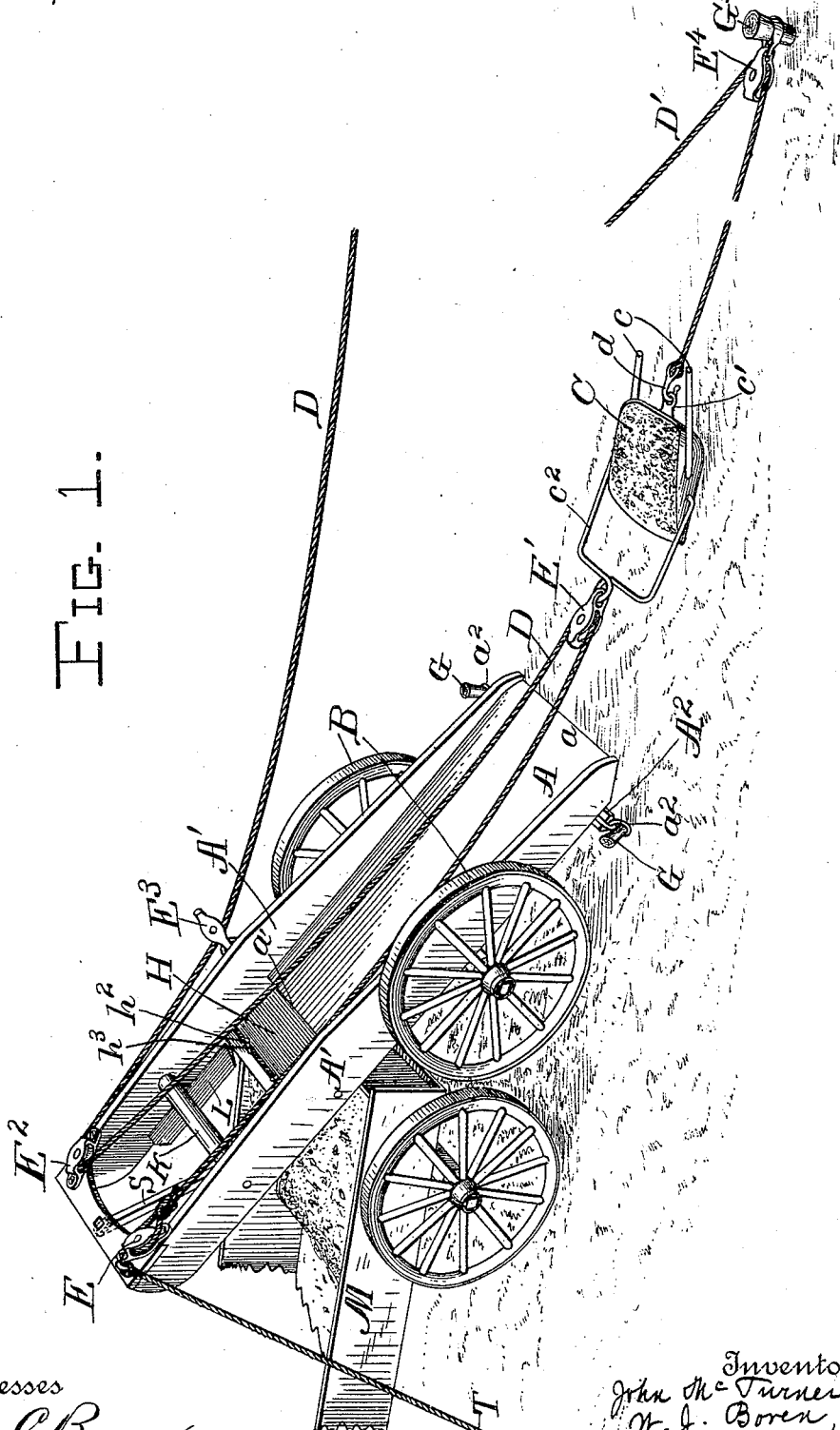

United States Patent Office.

JOHN McTURNER, WALTER J. BOREN, AND SAMUEL H. TURNER, OF HANNIBAL, MISSOURI.

APPARATUS FOR LOADING WAGONS WITH GRAVEL, SAND, &c.

SPECIFICATION forming part of Letters Patent No. 512,988, dated January 16, 1894.

Application filed September 6, 1893. Serial No. 484,937. (No model.)

*To all whom it may concern:*

Be it known that we, JOHN MC TURNER, WALTER J. BOREN, and SAMUEL H. TURNER, citizens of the United States, residing at Hannibal, in the county of Marion and State of Missouri, have invented certain new and useful Improvements in Apparatus for Loading Wagons with Gravel, Sand, Earth, &c.; and we do hereby declare the following to be a full, clear, and exact description of the invention, such as will enable others skilled in the art to which it appertains to make and use the same.

Our invention relates to improvements in apparatus for loading carts or wagons with gravel, earth, sand, or other like materials, and it consists of certain novel features hereinafter described and claimed.

Reference is had to the accompanying drawings, in which the same parts are indicated by the same letters, throughout the several views.

Figure 1 represents a perspective view of our improved apparatus, the motive power being omitted. Fig. 2 represents a central longitudinal section through the inclined chute and represents the scraper in the position just before it is dumped; and Fig. 3 represents a similar section to that shown in Fig. 2, just after the scraper has been dumped.

A represents an inclined chute having sides A' and cross piece $A^2$. The floor of the chute is curved as at $a$ and is cut away as at $a'$, while the cross piece $A^2$ is provided with rings or other equivalent devices $a^2$ to receive the stakes G by which the chute is steadied or anchored. This chute is mounted on the axle B' and the wheels B.

C represents a scraper of the ordinary type, which is provided with handle $c$, eye bolts $c'$, and loop $c^2$.

D represents the rope or chain for hauling the scraper first into the earth, thus filling the scraper, and then for hauling it up to the chute, and for dumping the same, as will be hereinafter described.

D' represents the rope for hauling back the scraper to the desired position. The rope D reeves through the block $E^3$ attached to the side of the chute, the block $E^2$ attached to the upper corner thereof, then down through the movable block E' attached to the scraper, and then back to the block E attached to the opposite upper corner of the chute. The block E may be supplanted by a pin or cleat to which the end of the rope may be attached, but we prefer to have a block on either side so that the rope D may be operated from either side, as may be desired. The rope D' reeves through the block $E^4$ held in place by the stake G', and this rope terminates in a hook $d$ engaging in the eye $c'$ of the scraper C. These various blocks may be of any desired construction, but should preferably be "snatch blocks."

H represents a trap door which is pivoted at $h$, weighted at $h'$, and provided with a projecting rib $h^2$ at its forward end. Pins or staples $h^3$ are provided to catch the point of the scraper and prevent it from slipping up over the rib $h^3$.

K represents a roller, and L represents one of two projecting supports or shelves to catch the loop of the scraper as shown in Fig. 3.

M represents the wagon to be loaded with earth. An inclined brace S and a stay T secured to a stake $t$ are also provided to support and steady the upper end of the frame.

The operation of the device is as follows:— The chute A is transported to the desired point, and the stakes G and $t$ are driven in place and the brace S and stay T are secured, all as shown in Fig. 1. The wagon is backed under the rear end of the chute, and a stake G' is driven in place and the ropes D and D' rove off, all as shown in Fig. 1. The scraper C is guided in the usual way, as by the handles $c$, and the rope D is pulled on by the team, or the revolving drum, or other source of power. The scraper is thrown into the ground until it is loaded, when it is guided toward the chute A, and being dragged up the said chute, as shown in Fig. 2, the point of the scraper ultimately strikes the ribs $h^2$, the trap door falls, and the contents of the scraper are dumped out, the scraper assuming the position shown in Fig. 3. Now the rope D is slacked off, and the rope D' is hauled on, and the scraper C is drawn back to the point where the excavation is being made. It will thus be seen that by pulling on the rope D with sufficient power the scraper is loaded, is dragged up the chute A, and is dumped, and that the said scraper is drawn back to the position for a second operation by simply hauling on the rope D'.

It will ordinarily be preferable to use a team of horses for the motive power, the team being unhitched from the wagon to be loaded, for that purpose, but it is immaterial as far as our invention goes, what source of power be employed for hauling on the ropes D and D'.

Having thus described our invention, what we claim, and desire to secure by Letters Patent of the United States, is—

1. An apparatus for loading carts or wagons, comprising a chute mounted on wheels, a trap door at the upper end of said chute provided with a projection at the upper end thereof; a scraper adapted to strike said projection when drawn upon said trap door; and a system of ropes and pulleys adapted to haul said scraper up said chute and onto said trap door, substantially as described.

2. An apparatus for loading carts or wagons, comprising a chute mounted on wheels, a trap door at the upper end of said chute provided with a projection at the upper end thereof; a scraper adapted to strike said projection at the upper end thereof; a scraper adapted to strike said projection when drawn upon said trap door; and a system of ropes and pulleys adapted to haul said scraper up said chute and on to said trap door, and to draw it back again, substantially as described.

3. An apparatus of the character described, comprising a chute A mounted on wheels, a trap door H near the upper end of said chute, a roller K and shelves L above said trap door, a scraper adapted to be drawn up said chute and on to said trap door, and a system of ropes and pulleys for drawing said scraper up said chute and for drawing it back again, substantially as described.

In testimony whereof we affix our signatures in presence of two witnesses.

JOHN Mc TURNER.
WALTER J. BOREN.
SAMUEL H. TURNER.

Witnesses:
WALTER D. ANDERSON,
G. PORTER.